United States Patent [19]
Barney et al.

[11] 3,743,143
[45] July 3, 1973

[54] APPARATUS FOR EXTRUDING PLASTIC MATERIAL

[75] Inventors: John J. Barney; James L. Flanagan, both of Chippewa Falls, Wis.

[73] Assignee: Leesona Corporation, Warwick, R.I.

[22] Filed: Sept. 10, 1971

[21] Appl. No.: 179,319

[52] U.S. Cl................... 222/145, 264/171, 425/131
[51] Int. Cl. ............................................. B29c 21/00
[58] Field of Search...................... 264/171; 425/130, 425/131; 222/145

[56] References Cited
UNITED STATES PATENTS

| | | | |
|---|---|---|---|
| 3,268,970 | 8/1966 | Kelly.................................... | 425/131 |
| 3,584,102 | 6/1971 | Fairbanks ........................ | 264/171 X |
| 727,214 | 5/1903 | Seeser................................. | 264/171 X |
| 2,971,679 | 2/1961 | Pavia ............................... | 222/413 X |

*Primary Examiner*—Robert B. Reeves
*Assistant Examiner*—Thomas E. Kocovsky
*Attorney*—Albert P. Davis et al.

[57] ABSTRACT

Apparatus for extruding plastic material comprising an extruder having a passaged junction box disposed adjacent an extrusion die is disclosed. The junction box incorporates a flexible junction plate which is positioned at the junction where diverse thermoplastic resinous streams of material merge or marry into a common laminar flow path. The flexible junction plate automatically adjusts its position in the common flow path of the diverse streams in response to the differential in the rates at which the diverse thermoplastic materials are fed through the common flow path to the extrusion die. By virtue thereof the junction where the diverse materials marry preliminary to coextrusion to form a composite sheet or laminate is smooth and linear. This promotes uniformity of relative thickness of the individual layers or laminae throughout the composite sheet. Moreover, since the adjustment of the junction plate is automatic as a function of the rate at which the several thermoplastic materials are delivered into the common flow path, there is no need to disassemble the extrusion apparatus to reset the junction plate when the rate at which the respective diverse thermoplastic streams are altered.

9 Claims, 11 Drawing Figures

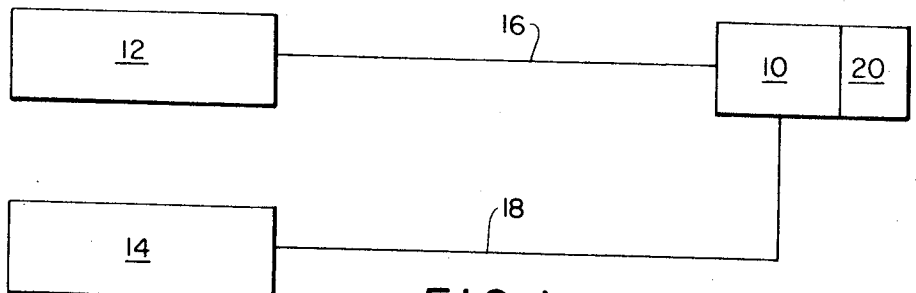
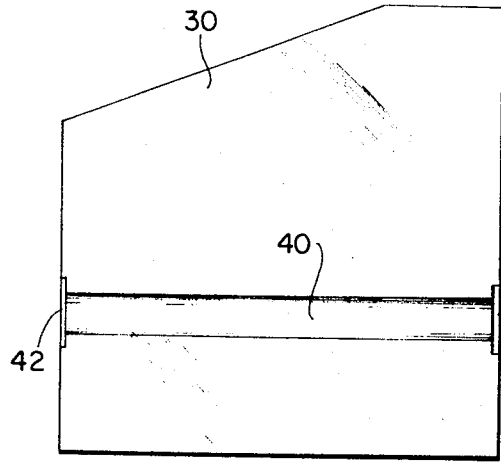
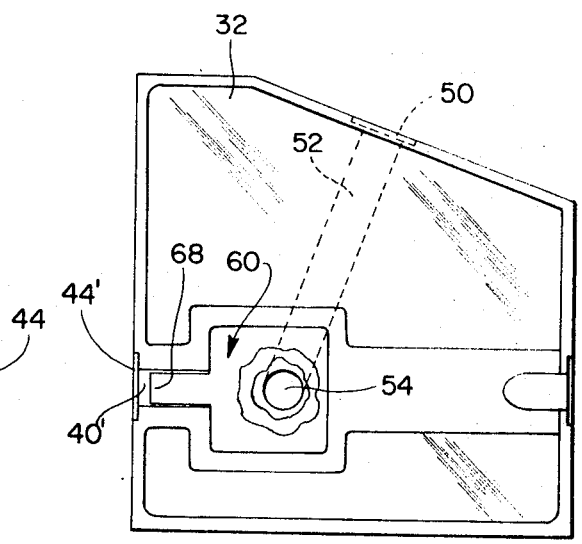
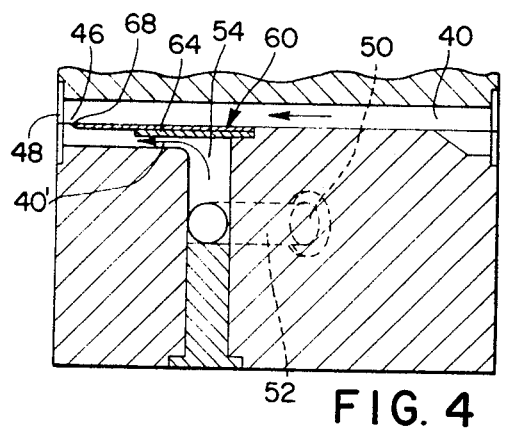
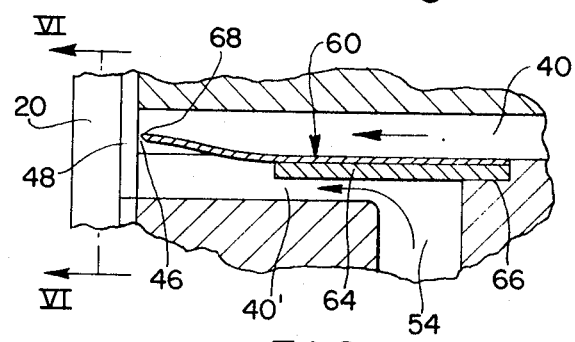
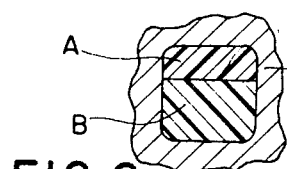
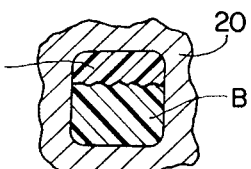
INVENTORS
JOHN J. BARNEY
JAMES L. FLANAGAN
BY
ATTORNEYS

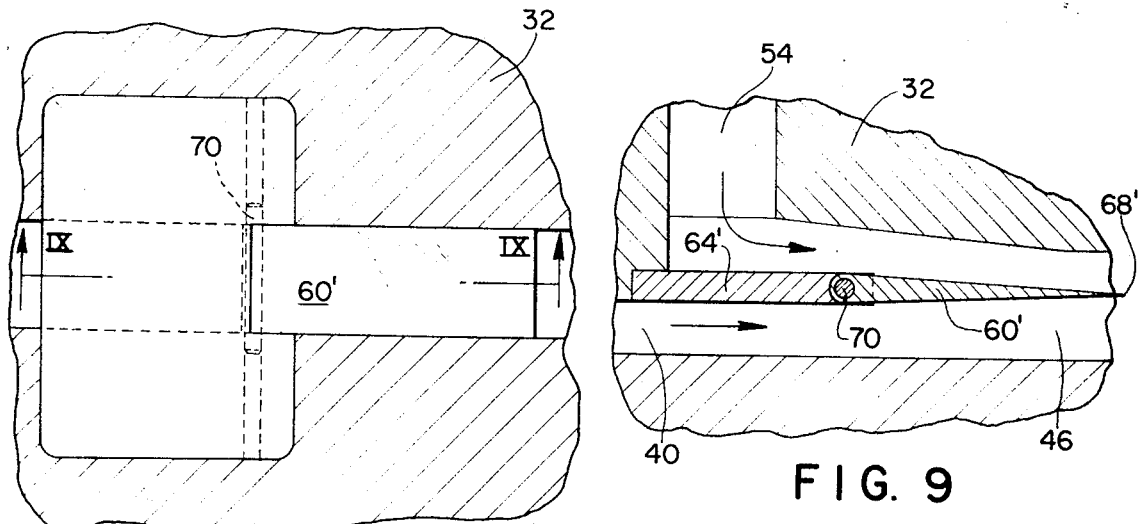
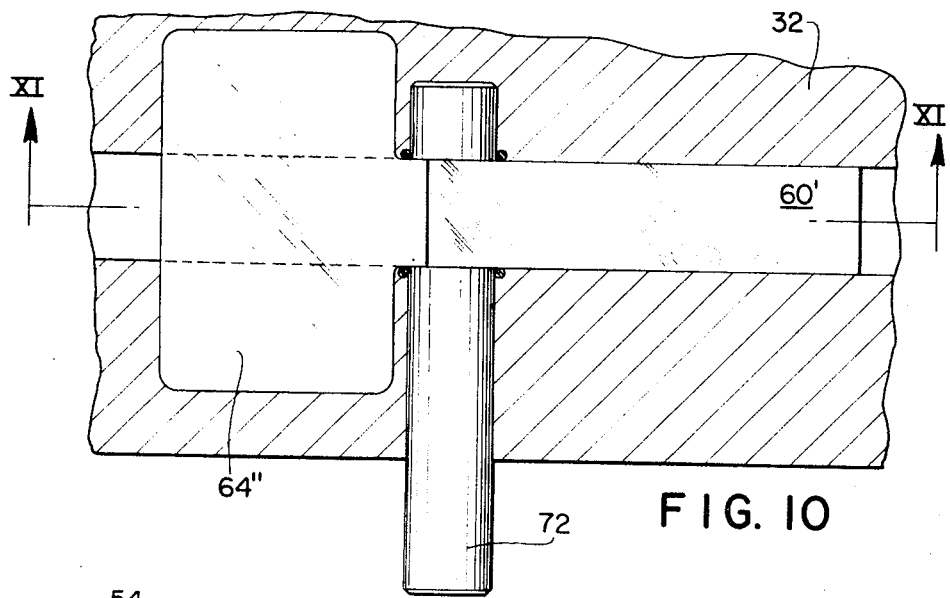
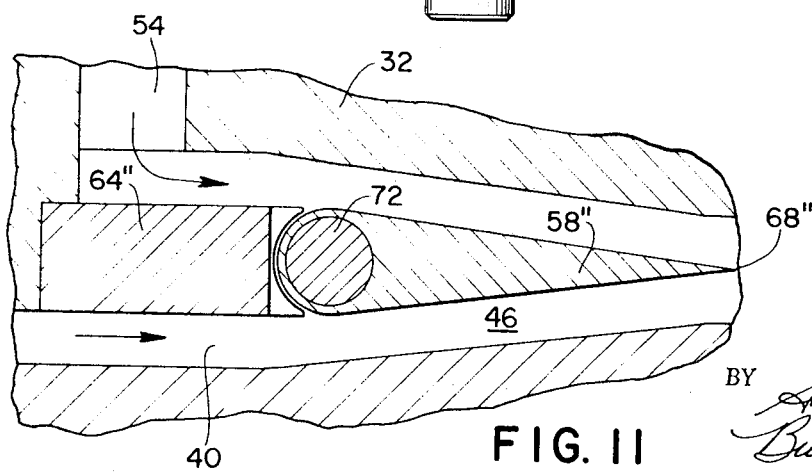

APPARATUS FOR EXTRUDING PLASTIC MATERIAL

BACKGROUND OF THE INVENTION

The present invention relates to apparatus for extruding plastic material and relates, more particularly, to apparatus for the coextrusion of two or more thermoplastic resinous streams into a composite sheet or laminate having a plurality of uniform, parallel layers.

The present invention incorporates improvements in extrusion apparatus of the type disclosed in commonly assigned copending U.S. Pat. application Ser. No. 70,732 filed Sept. 9, 1970.

In the extrusion apparatus of the cited patent application a junction box is disclosed which incorporates a rectangular or square feed port at the junction where diverse thermoplastic resinous streams of material merge or marry. Also within that junction box there is provided a diverter junction plate which is disposed in a fixed position in the common flow path of the diverse resinous streams. The extrusion apparatus of the patent application admirably provides means for merging or marrying the diverse streams of materials into a composite turbulance-free stream with the conjoining of the streams occurring smoothly and linearly, all of which contributes to the individual laminae having uniformity of relative thickness throughout the extruded composite sheet. However, the existance of a fixed junction plate necessitates rather laborious and time consuming disassembly of the extrusion apparatus in order to reposition the junction plate in the event that the rates of flow of the diverse materials entering the common stream is altered. If such alteration of the position of the junction plate is not made to compensate for the changing rates of flow the cross section of the laminae constituting the composite sheet ultimately produced may show distortion. This results from the non-linear transition which the diverse materials are required to made at the juncture where they merge.

SUMMARY OF THE INVENTION

The present invention is particularly directed to the provision in extrusion apparatus of the type disclosed in the aforementioned U.S. Pat. application Ser. No. 70,732 of a flexible junction plate which by virtue of its flexibility is readily and automatically adjustable in the common flow path of the diverse materials to the extruder die to thereby provide for a smooth and linear marrying of the diverse materials so that the individual layers of the multilayered composite sheet which is ultimately produced have uniform relative thicknesses throughout the full extent of the composite sheet. The automatic adjustment is achieved by virtue of the fact that the flexible junction plate is readily yieldable under the differential inflow rates of the diverse materials entering into the common flow path of the extrusion apparatus. It is within the scope of the invention to include a hinged junction plate in place of the flexible junction plate, the hinged junction plate being either automatically yieldable under the differential in volumes of the respective materials flowing along the common flow path to assume the correct attitude therefor or, on the other hand, being of the type wherein manipulating means extending exteriorly of the extrusion apparatus is utilized to set the junction plate in its correct attitude consistent with the desired layer ratios so that, again, a smooth and linear flow of the multiple diverse streams to the junction point is achieved whatever the flow rates of the diverse materials to the common flow path may be.

OBJECTS OF THE INVENTION

One object of the invention is to provide improved extrusion apparatus for coextruding diverse thermoplastic materials wherein the extruding apparatus incorporates a junction member automatically adjustable to provide smooth and linear merging of the diverse thermoplastic materials irrespective of the respective rates at which the materials are presented in a common flow path to a die.

Another object of the invention is to provide improved extrusion apparatus capable of coextruding varying ratios of diverse thermoplastic materials wherein the extrusion apparatus incorporates a readily adjustable junction plate which is responsive to varying ratios of diverse thermoplastic materials directed along a common flow path for the diverse materials to thus provide a smooth and linear merging of the materials without the need for disassembling the extrusion apparatus in order to set the junction plate in its proper attitude to achieve the desired smooth and linear merging.

These and other objects of the invention will in part be obvious and will in part appear hereinafter.

DESCRIPTION OF THE DRAWING

FIG. 1 is a schematic view of coextrusion apparatus incorporating the present invention;

FIG. 2 is an elevational view of one portion of the improved junction box of the present invention;

FIG. 3 is an elevational view of the mating portion of the junction box portion illustrated in FIG. 2 and illustrating the improved junction plate attached thereto;

FIG. 4 is a view taken generally along lines IV—IV of FIG. 3 with a portion of mating portion of the junction box added, illustrating the junction plate situated in the position it assumes when relaxed or inactive or, in the alternative, in the position it assumes when the ratio of diverse materials being delivered to the common flow path is 1:1;

FIG. 5 is an enlarged detailed view of a portion of FIG. 4 illustrating in greater detail particulars of one form of the improved junction plate and showing the operative position of the junction plate when the diverse thermoplastic materials are flowed past the plate in approximately a 2:1 ratio;

FIG. 6 is a sectional view taken substantially along lines VI—VI of FIG. 5 just downstream of the junction plate and illustrating the configuration of multiple laminae in composite sheet and showing the smooth and linear merging obtained during the formation of such a composite sheet in practice with the present invention;

FIG. 7 is a view similar to FIG. 6 but illustrating the configuration which may be assumed by the individual films in a composite sheet when the merger of the several thermoplastic materials occurs in a non-linear or turbulent manner;

FIG. 8 is a view similar to FIG. 3 illustrating one modification of the invention;

FIG. 9 is a view taken generally along lines IX—IX of FIG. 8;

FIG. 10 is a view similar to FIGS. 3 and 7 and illustrating yet another modification of the invention; and FIG. 11 is a view taken along lines XI—XI of FIG. 10.

DESCRIPTION OF THE PREFERRED EMBODIMENT

Referring initially to FIG. 1 there is schematically illustrated the improved junction box 10 in operative association with a pair of conventional extruders or resin sources 12 and 14. The extruders 12 and 14 operatively communicate with the junction box 10 by means of conduits 16 and 18, respectively, and the discharge portion of junction box 10 is in communication with a sheeting die 20 having an elongated extrusion orifice (not shown) from which the coextruded composite sheet is delivered to conventional sheet take-up means. The extruders 12, 14 serve as sources of heat plastified thermoplastic, resinous materials which may be of like or unlike kinds, and for purposes of the description herein, the materials delivered from each of the extruders 12 and 14 will simply be characterized as "diverse materials."

With particular reference now to FIGS. 2–6 the junction box 10, except as will be specifically discussed hereinafter, may be identical in construction with the junction box disclosed in the prior cited commonly assigned copending U.S. Pat. application Ser. No. 70,732. Briefly, the junction box 10 of that patent application is constituted as a block-like housing comprised of a pair of mating plate members 30, 32 with the plate 30 having an axial passage 40 which is square or rectangular in cross section extending across the plate as shown in FIG. 2. Passage 40 defines respective entry and exit openings 42 and 44 at opposite ends of plate 30. Mating plate 32 has at its forward end a square or rectangular passage 40' and an exit opening 44' both of which mate with their counterparts in plate 30 to provide a common flow passage or chamber 46 and a common exit 48 (see FIG. 5) which are square or rectangular in cross section. The conduit 16 connects with entry opening 42 to deliver a first supply of heat plastified thermoplastic material from extruder 12 through passage 40 toward exit 48. The second source of heat plastified thermoplastic material from extruder 14, delivered through conduit 18, enters junction box 10 through opening 50 in plate 32, flows through a passage 52 in the plate and into a further passage 54 into which passage 48 opens. Passage 54 is disposed at right angles to passage 40' in plate 32 and interconnects therewith at a locus which may be considered to form one end of chamber 46, the opposite end of the chamber being exit 48. The novel junction plate of the present invention when in its relaxed state lies on generally the axial mid-line of chamber 46 in the manner as illustrated in FIG. 4. It will be appreciated from the foregoing summary and the detailed disclosure of U.S. Pat. application Ser. No. 70,732 that the diverse heat plastified thermoplastic materials flowing from extruders 12 and 14 thus merge in chamber 46 and, more particularly, at the downstream end of the junction plate therein to provide a composite multi-layered stream which flows to die 20 to be coextruded to form a laminated sheet.

In the cited patent application there is disclosed a junction plate which quite satisfactorily serves the purpose of causing the diverse materials delivered into the common flow passage within chamber 46 to merge smoothly and linearly so that the relative film thicknesses of the individual sheets forming the composite sheet are maintained uniform throughout the full extent of the composite sheet. However, the junction member of that patent application must be adjusted to accommodate the varying ratios of materials flowing into the common flow path. This necessitates disassembly of the junction box, manual resetting of the attitude of the junction plate, and finally, of course, reassembling the junction box. The present invention incorporates an improved junction plate 60 cantilevered from a rigid supporting platform 64 fastened in a suitable seat at 66 which is milled into the wall of the junction box with the platform extending forwardly in partial blocking relationship to passage 54. Platform 64 thus acts as an initial diverter which turns the material entering chamber 46 into a common flow path with that being delivered via passage 40, as shown by the arrows in FIGS. 4 and 5. Junction plate 60 is so supported from platform 64 that the forward edge 68 of the junction plate is configured as a straight, flat edge. Further, as best seen in FIG. 3 junction plate 60 is generally coextensive with the width of chamber 46. Furthermore, as stated earlier, the junction plate, when in a relaxed condition, lies in a plane substantially along the axial mid-line of the chamber 46, as seen in FIG. 4 although this same position would be assumed by plate 60 if the ratio of the materials delivered through passages 40 and 54 was 1:1. As a result of the disposition of junction plate 60, and its plane outer edge 68, heat plastified thermoplastic material admitted through the opening 42 and flowing through passage 40 from extruder 12, and the diverse heat plastified thermoplastic material admitted through opening 50 from extruder 14, flowing through passages 52 and 54 and being diverted toward exit 48 by platform 66 effect transition into a merged state at said plane edge without undesirable turbulance or intermixing in chamber 46, and are thus delivered to the die as a composite stream of discrete layers which contributes to the production of a laminated sheet from die 20 having substantially the cross sectional configuration as shown in FIG. 6.

With continuing reference now to FIG. 6 and assuming the composite sheet to be the product of diverse thermoplastic material A from extruder 12 and material B from extruder 14 in a ratio of approximately 2:1 B to A, junction plate 60 would assume the attitude depicted in FIG. 5 due to the fact that the increased volume of material B delivered through passage 54 would be generally twice as great as material A arriving in chamber 46. The inherently flexible nature of junction plate 60 affords the automatic adjustment of plate 60 to accommodate for the increased volume of material B in this example, while simultaneously compensating for the decreased volume of material A flowing through passage 40. As a result, the transitional point where materials A and B merge, i.e., the downstream plane edge 68 of plate 60, is smooth. Turbulence and intermixing of materials A and B is avoided, and uniform distribution of the materials A and B across the sheet is achieved. This is in distinct contrast to the undesirable cross-sectional variations in the layers which is depicted by the undulating line between the layers in FIG. 7 where it is to be assumed that transitional turbulance was permitted to occur. It will be obvious that the relative thicknesses of the plastic layers A and B may be widely varied depending upon the contemplated use of the final composite structure and these variations may be accommodated in practice with the present invention by merely varying the volume of the relative diverse thermoplastic materials delivered from extruders 12 and 14 to establish the desired material ratio. By virtue of the flexibility of the junction plate 60 and the consequent automatic adjustment of the attitude of the plate in chamber 46 permitted thereby, the transition point where materials A and B merge is caused to be smooth and linear. The junction plate 60 may be constructed of any suitable material having the requisite inherent of flexibility contemplated by the present invention. For example, 0.010 inch thickness stainless steel has been found satisfactory in practice with the present invention.

From the foregoing it will be readily apparent that while fixed junction plates can be adapted to accommodate varying rates of diverse molten materials delivered to a common chamber for merging and subsequent delivery to a common die for coextrusion, such adaptation cannot be accomplished without disassembling the device and reorienting the junction plate to accommodate the change in material ratios. In clear contradistinction thereto, in practice with the present invention, changes in material ratios flowing from extruders 12 and 14 is readily and automatically accommodated by virtue of the fact that the flexible junction plate 60 easily adjusts to the necessary attitude as a response to the differential in the volume of the diverse materials being fed to chamber 46.

MODIFICATIONS

With attention now to FIGS. 8 and 9 of the drawing there is depicted therein one modification of the present invention. In this modification there is provided a platform 64' which is suitably fixed in a wall of plate 32 and projects forwardly therefrom in partial blocking relationship to passage 54 to provide a support and act as a fluid diverter in the same manner as platform 64 hereinbefore described. The forward end of platform 64 has a pintle 70 affixed therein onto which a freely movable junction plate 60' is hinged. Junction plate 62' is tapered to a smooth straight edge 68' as it extends outwardly into chamber 46. It will be apparent that junction plate 60' in the instant embodiment is freely movable in response to varying ratios of thermoplastic material delivered from extruders 12 and 14 to adjust automatically for the varying ratios of the diverse materials in the same manner as the flexible junction plate 60 described earlier. By virtue of such automatic adjustment the junction where the two thermoplastic materials A and B merge at the outer terminus of plate 60' is smooth and linear due to the ready movement of junction plate about its pintle.

In FIGS. 10 and 11 there is shown still a further modification of the invention. In this embodiment there is provided a supporting platform 64" suitably seated in member 32 and partial blocking passage 54 in the same manner and for the same purposes as described with respect to platform 64. A rotatable junction plate 60" is juxtaposed with the forward end of platform 64" and a stub shaft 72 is pierced through a bore in wall 38. Stub shaft 72 terminates at one of its ends in a blind hole bored through the wall of plate 32 and terminates at its other end exteriorly of the wall a sufficient distance to permit a firm grip to be had on the end of the stub shaft. Intermediate its opposite ends the stub shaft 72 has a junction plate 60" affixed thereon for rotation therewith. By virtue of the fact that the outer end of stub shaft 72 extends outwardly of plate 32 said end provides a suitable grip by which the junction plate can be readily manipulated manually to adjust for the varying ratios of thermoplastic materials A and B being delivered from extruders 12 and 14. Here again, the junction where the diverse thermoplastic materials A and B merge, i.e., at plane edge 68" of plate 60" is smooth and linear thus affording a composite sheet wherein diverse films constituting the composite sheet are of uniform thickness throughout the sheet as seen in FIG. 6.

From the foregoing it will be appreciated that the present invention provides unique extrusion apparatus for manufacturing coextruded thermoplastic film wherein the diverse materials to be coextruded are married at a junction within the extrusion apparatus in a smooth and linear manner so that the relative film thicknesses or the ratio of the composite material laminae is maintained uniform and linear throughout the composite sheet.

Since certain changes may be made in the above apparatus without departing from the scope of the invention herein involved it is intended that all matter contained in the above description and shown in the accompanying drawing shall be interpreted as illustrative only and not in a limiting sense.

What is claimed is:

1. Apparatus for use in coextrusion of diverse heat plastified thermoplastic materials into a composite sheet comprising: a junction member defining a chamber therein, said chamber having at its downstream end an exit orifice interconnected with an extrusion die, a first inlet for delivering a first stream of heat plastified material into said chamber, a second inlet for delivering a second stream of heat plastified material into said chamber, a diverter member disposed in said chamber and operable to guide said streams in a downstream direction toward said orifice, said diverter member including a movable portion extending in said downstream direction, said movable portion having a plane edge generally coextensive with the width of said chamber and being movable to dispose said edge in the plane of the junction where said first and second streams conjoin to thus afford linear merging oF said streams at said junction for delivery to said die.

2. Apparatus as set forth in claim 1 wherein said movable portion is a plate, and including means for pivotally supporting said plate on said diverter member.

3. Apparatus as set forth in claim 1 wherein said movable portion is a plate, and including means for pivotally supporting said plate, said supporting means extending exteriorally of said junction member to afford rotation of said plate.

4. Apparatus as set forth in claim 1 wherein said junction member comprises a pair of plate members secured in face to face relationship with said inlets being formed in said plate members.

5. Apparatus as set forth in claim 1 wherein said first and second inlets are formed in angular relationship to each other, said diverted member extends into said chamber to partially block the flow of the stream from one of said first and second inlets, said movable portion is supported on said diverter member with the plane edge thereof being disposed downstream of said diverter member, said diverter member directs the flow of one of said first and second streams against one surface of the movable portion and the other of said first and second streams flows over the opposite side of the movable portion and said movable portion moves within said chamber in response to the differential in the flow rates of said first and second streams into said chamber.

6. Apparatus as set forth in claim 1 wherein said movable portion is comprised of flexible material adapted to position said plane edge at said junction in response to the respective flow rates of said first and second streams.

7. Apparatus as set forth in claim 6 wherein said chamber is non-circular in cross section.

8. Apparatus as set forth in claim 6 wherein said diverter member is an elongated rigid member, and at least one of said first and second streams enters said chamber at an angle to said rigid member and is directed toward said orifice by said rigid member.

9. Apparatus as set forth in claim 6 wherein said movable portion is supported on said diverter member and extends downstream from a forward end of said diverter member.

* * * * *